United States Patent
Sugimoto et al.

(10) Patent No.: US 10,788,933 B2
(45) Date of Patent: Sep. 29, 2020

(54) TACTILE PRESENTATION PANEL, TACTILE PRESENTATION DEVICE AND ELECTRONIC EQUIPMENT

(71) Applicant: NLT TECHNOLOGIES, LTD., Kawasaki, Kanagawa (JP)

(72) Inventors: Daisuke Sugimoto, Kawasaki (JP); Hiroshi Haga, Kawasaki (JP)

(73) Assignee: TIANMA MICROELECTRONICS CO., LTD., Longhua District, Shenzhen (CN)

(*) Notice: Subject to any disclaimer, the term of this patent is extended or adjusted under 35 U.S.C. 154(b) by 37 days.

(21) Appl. No.: 15/630,011

(22) Filed: Jun. 22, 2017

(65) Prior Publication Data

US 2017/0371490 A1    Dec. 28, 2017

(30) Foreign Application Priority Data

Jun. 24, 2016    (JP) ................ 2016-125802

(51) Int. Cl.
*G06F 3/01* (2006.01)
*G06F 3/044* (2006.01)
*G06F 3/041* (2006.01)

(52) U.S. Cl.
CPC ............ *G06F 3/0418* (2013.01); *G06F 3/016* (2013.01); *G06F 3/041* (2013.01); *G06F 3/044* (2013.01); *G06F 2203/04111* (2013.01)

(58) Field of Classification Search
CPC .................. G06F 3/016; G06F 3/041; G06F 3/0412–0418; G06F 3/044; G06F 2203/04101; G06F 2203/04111; G06F 2203/04112; G09G 5/18; H03K 17/962; H03K 17/9622; H03K 2217/96031; H03K 2217/96062; G09B 21/003; G09B 21/004; G08B 6/00
See application file for complete search history.

(56) References Cited

U.S. PATENT DOCUMENTS

| | | | |
|---|---|---|---|
| 8,514,185 B2 * | 8/2013 | Hotelling | G06F 3/044 345/156 |
| 9,285,931 B2 * | 3/2016 | Mamba | G06F 3/044 |
| 2008/0131624 A1 * | 6/2008 | Egami | G06F 3/045 428/1.1 |
| 2009/0213090 A1 * | 8/2009 | Mamba | G06F 3/044 345/174 |

(Continued)

FOREIGN PATENT DOCUMENTS

| | | |
|---|---|---|
| JP | 2010-86471 A | 4/2010 |
| JP | 2011-53033 A | 3/2011 |

(Continued)

OTHER PUBLICATIONS

Notice of Reasons for Refusal dated Jan. 28, 2020, issued by the Japanese Office in Application No. 2016-125802.

*Primary Examiner* — Nathan Danielsen
(74) *Attorney, Agent, or Firm* — Sughrue Mion, PLLC

(57) ABSTRACT

A tactile presentation panel includes a support substrate, a drive electrode located on the support substrate, a first insulating film located on the support substrate and covering the drive electrode, a plurality of floating electrodes electrically independent from one another disposed on the first insulating film, and a second insulating film covering the plurality of floating electrodes.

12 Claims, 22 Drawing Sheets

(56) References Cited

U.S. PATENT DOCUMENTS

| | | | |
|---|---|---|---|
| 2010/0085169 A1 | 4/2010 | Poupyrev et al. | |
| 2012/0128960 A1* | 5/2012 | Busgen | F15D 1/12 |
| | | | 428/220 |
| 2013/0155000 A1* | 6/2013 | Trend | G06F 3/044 |
| | | | 345/174 |
| 2013/0164543 A1 | 6/2013 | Shibuya et al. | |
| 2013/0307789 A1* | 11/2013 | Karamath | G06F 3/016 |
| | | | 345/173 |
| 2014/0043284 A1* | 2/2014 | Park | G06F 3/044 |
| | | | 345/174 |
| 2014/0049271 A1* | 2/2014 | Trend | G01R 27/2605 |
| | | | 324/663 |
| 2014/0266648 A1 | 9/2014 | Makinen et al. | |
| 2015/0103024 A1* | 4/2015 | Haga | G06F 3/016 |
| | | | 345/173 |
| 2015/0140302 A1* | 5/2015 | Fujii | G06F 3/044 |
| | | | 428/216 |
| 2015/0316986 A1* | 11/2015 | Xue | G06F 3/016 |
| | | | 345/17 |

FOREIGN PATENT DOCUMENTS

| | | |
|---|---|---|
| JP | 2013-152714 A | 8/2013 |
| JP | 2015-097076 A | 5/2015 |

* cited by examiner

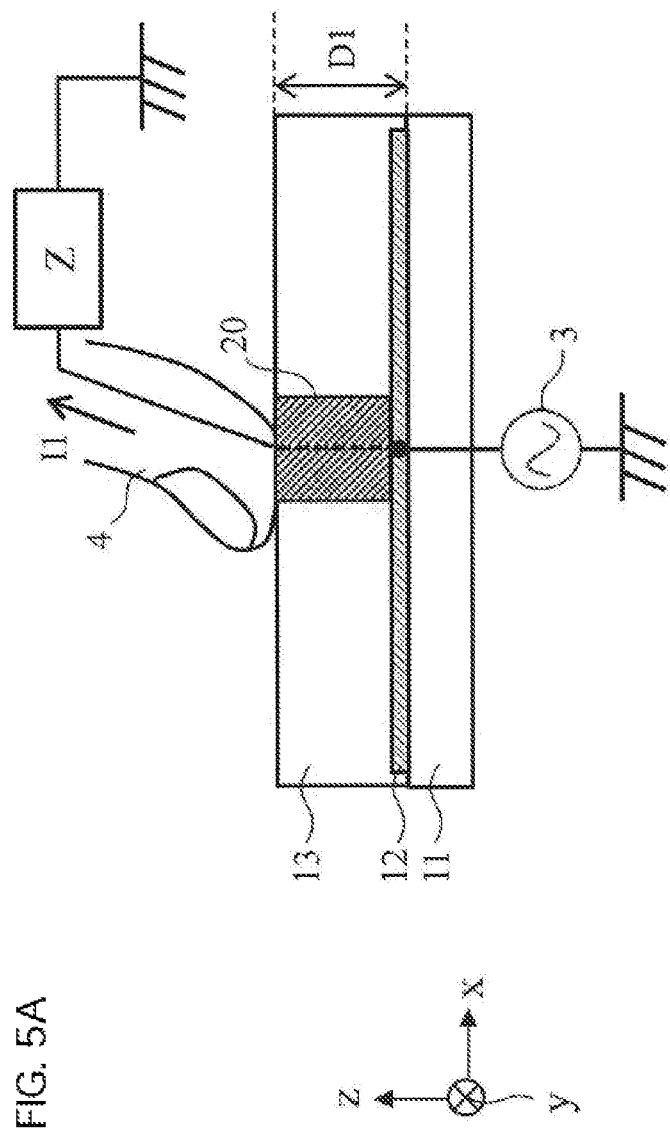

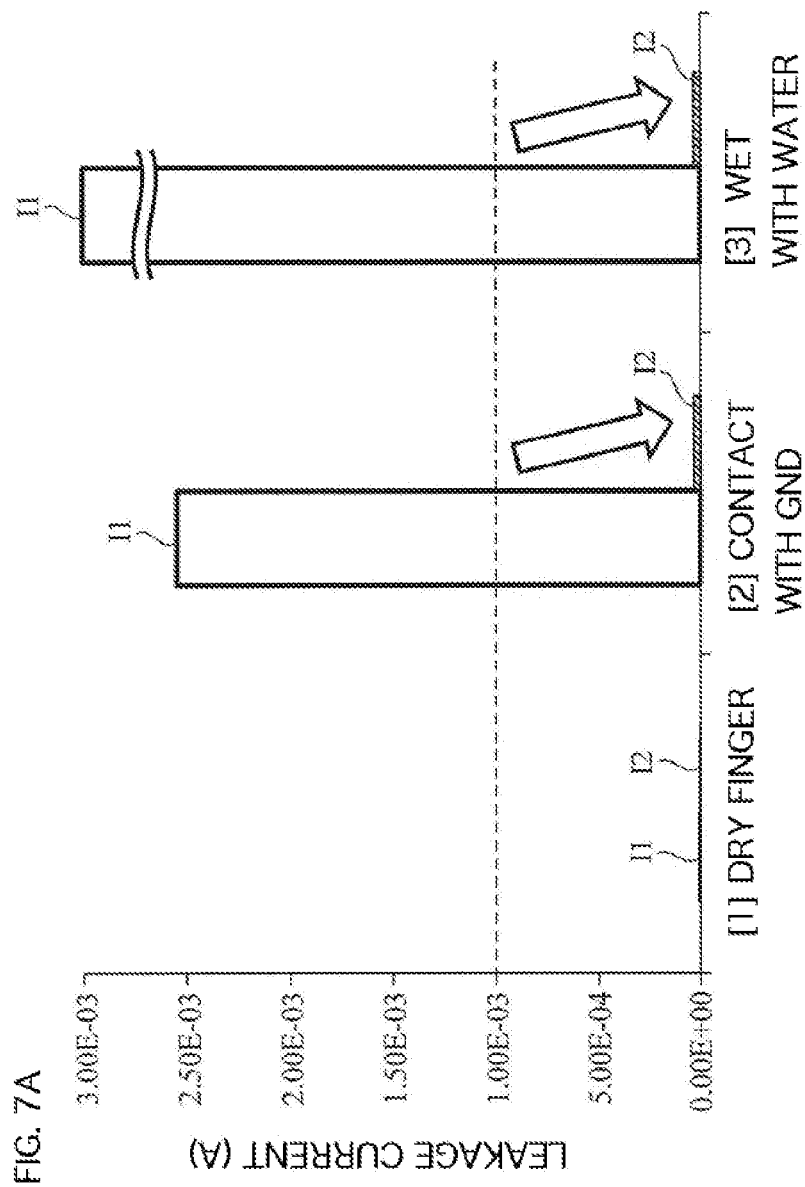

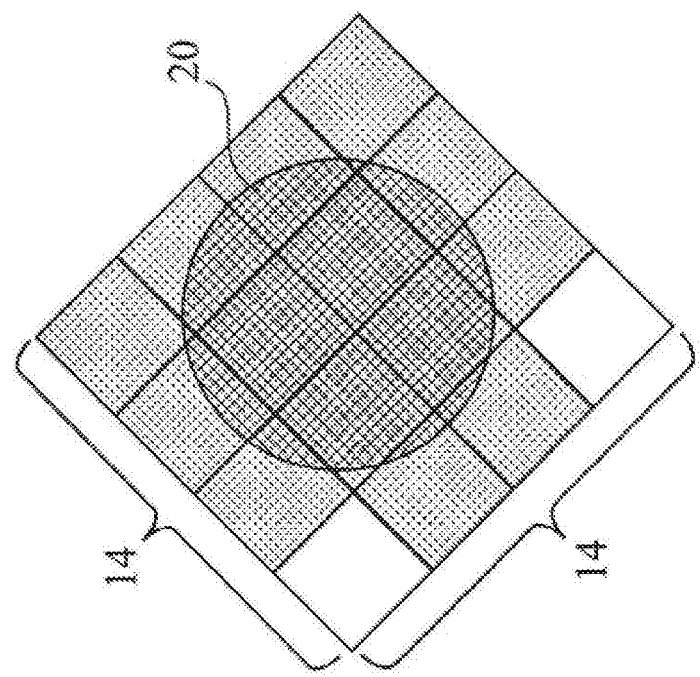
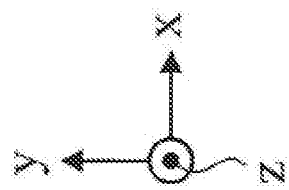
FIG. 13

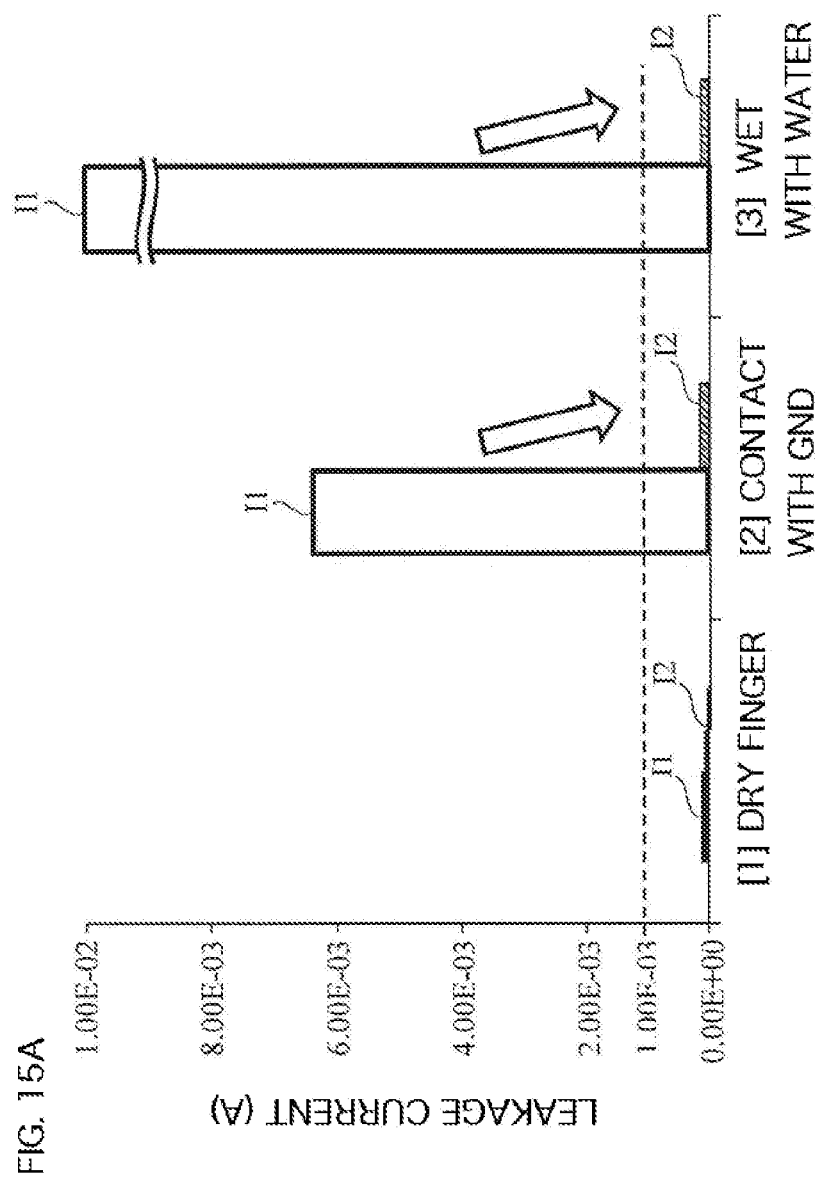

TACTILE PRESENTATION PANEL, TACTILE PRESENTATION DEVICE AND ELECTRONIC EQUIPMENT

CROSS-REFERENCE TO RELATED APPLICATIONS

This Nonprofessional application claims priority under 35 U.S.C. § 119(a) on Patent Application No. 2016-125802 filed in Japan on Jun. 24, 2016, the entire contents of which are hereby incorporated by reference.

FIELD

The present application relates to a tactile presentation panel, a tactile presentation device and electronic equipment.

BACKGROUND

Recently, there are a number of information devices mounted with a touch panel. A touch panel may directly detect a position of operation by a human body (e.g., finger) to use the position for input, and is effective for improvement in the usability of the user. Currently, such a touch panel is present that employs the technology of presenting a sense of tactile perception, pressure or vibration (hereinafter referred to as "tactile sense"). To present the feel of texture of an object surface as the tactile sense, for example, electrostatic force generated on a panel surface is used. The electrostatic force here is generated through the capacitive coupling formed between a human body and an electrode that are opposed to each other across an insulating film.

An example of such technology includes a tactile presentation device described in the publication of United States Patent Application No. 2014/0266648. The tactile presentation device has a configuration where a conductor to which signal voltage is directly applied, an insulating layer, a semiconductor layer and a surface insulating layer are layered in the order from the lower layer side to the upper layer side touching a human body, to make the user perceive the tactile sense through the capacitive coupling formed between the semiconductor layer and the human body.

It is however possible that the surface of the panel used for the presentation of tactile sense may be damaged during the use, resulting in a scar which may grow in the depth direction to reach the electrodes.

Moreover, a conductive foreign substance such as water may intrude into the scar, for example. In the example described in the publication of United States Patent Application No. 2014/0266648, a conductive foreign substance may possibly intrude into the scar which extends from the surface of the surface insulating layer to the semiconductor layer.

It is however difficult to recognize the depth and internal state of the scar by visual contact from the surface side. Thus, the user may continue using the panel with an advanced scar. In the case where the panel in such a state is used, charge accumulated in the electrodes may leak out to the human body through the foreign substance when the user touches the portion with the scar. The charge flowing here is referred to as "leakage current" in the description below.

Even if the leakage current flows, the human body will not be affected if the magnitude thereof is sufficiently low. However, the tactile presentation device described in the publication of United States Patent Application No. 2014/0266648 does not suggest the necessity or mechanism of reducing such current. For example, charge proportional to the magnitude of the electrostatic capacitance of the capacitor formed between the conductor and the semiconductor layer is accumulated in the semiconductor layer, while the magnitude of the electrostatic capacitance is proportional to the area of the semiconductor layer.

Meanwhile, the area of the semiconductor layer used in the tactile presentation device described in the publication of United States Patent Application No. 2014/0266648 is substantially the same as the size of the operation region used for operation by the user. Thus, the magnitude of the electrostatic capacitance of the capacitor formed between the semiconductor layer and the conductor necessarily takes a large value, making it difficult to suppress the magnitude of the leakage current.

SUMMARY

According to one aspect, a tactile presentation panel includes a support substrate, a drive electrode located on the support substrate, a first insulating film located on the support substrate and covering the drive electrode, a plurality of floating electrodes independent from one another disposed on the first insulating film, and a second insulating film covering the plurality of floating electrodes.

It is to be understood that both the foregoing general description and the following detailed description are exemplary and explanatory and are not restrictive of this disclosure.

BRIEF DESCRIPTION OF THE DRAWINGS

FIG. 5A illustrates the sectional structure of Comparative Example 1 used for simulation;

FIG. 7A is a graph illustrating simulation results obtained for different states of the human body;

FIG. 13 illustrates a positional relationship in the case where a foreign substance is in contact with the largest number of floating electrodes;

FIG. 15A is a graph illustrating simulation results obtained for different states of a human body;

DESCRIPTION OF EMBODIMENTS

Embodiments of the present invention will now be described with reference to the drawings. It is understood that the embodiments described below are mere examples pertaining to the scope of the invention.

Embodiment 1

Figure 1:
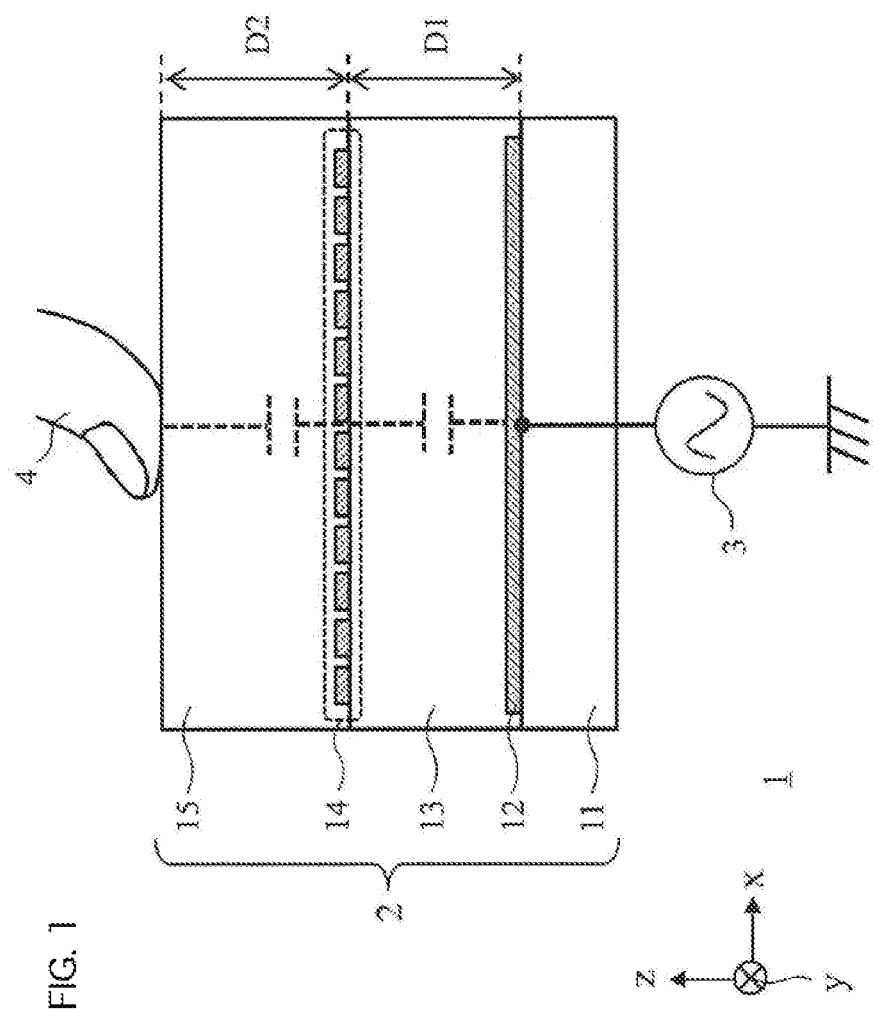
FIG. 1 is a section view illustrating the schematic configuration of a tactile presentation device according to Embodiment 1 (corresponding to the position along I-I in FIG. 2)

FIG. 1 illustrates the schematic configuration of a tactile presentation device 1 according to Embodiment 1. The tactile presentation device 1 is configured with a tactile presentation panel 2 and a signal power supply 3. The tactile presentation panel 2 is driven by a drive signal applied from the signal power supply 3, e.g., by a voltage signal, to allow the user who uses the panel surface as an operation region to perceive the tactile sense. It is assumed in the present embodiment that the signal power supply 3 is externally connected to the tactile presentation panel 2. However, the signal power supply 3 may also be integral with the tactile presentation panel 2.

The tactile presentation panel 2 is constituted by a support substrate 11, a drive electrode 12, a first insulating film 13, floating electrodes 14 and a second insulating film 15. On the upper surface of the support substrate 11, the drive electrode 12, the first insulating film 13, the floating electrodes 14 and the second insulating film 15 are layered in the described order from the lower layer side to the upper layer side touching the human body. For the respective members, known materials are used, which will be described later. It is noted that each of the members constituting the tactile presentation panel 2 is desirably made of transparent material in the case where characters, images, video and other information need to be visually recognized by seeing through the tactile presentation device 1. If it is unnecessary to visually recognize information by seeing through the tactile presentation device 1, each of the members constituting the tactile presentation panel 2 may be made of non-transparent material.

The drive electrode 12 is a single electrode having substantially the same area as the support substrate 11. The first insulating film 13 is formed on the upper surface of the support substrate 11, and is disposed to cover the entire surface of the drive electrode 12. According to the present embodiment, acrylic resin is used for the first insulating film 13. According to the present embodiment, the first insulating film 13 has a film thickness D1 of 5 μm. It is understood that this numeric value is a mere example.

Figure 2:
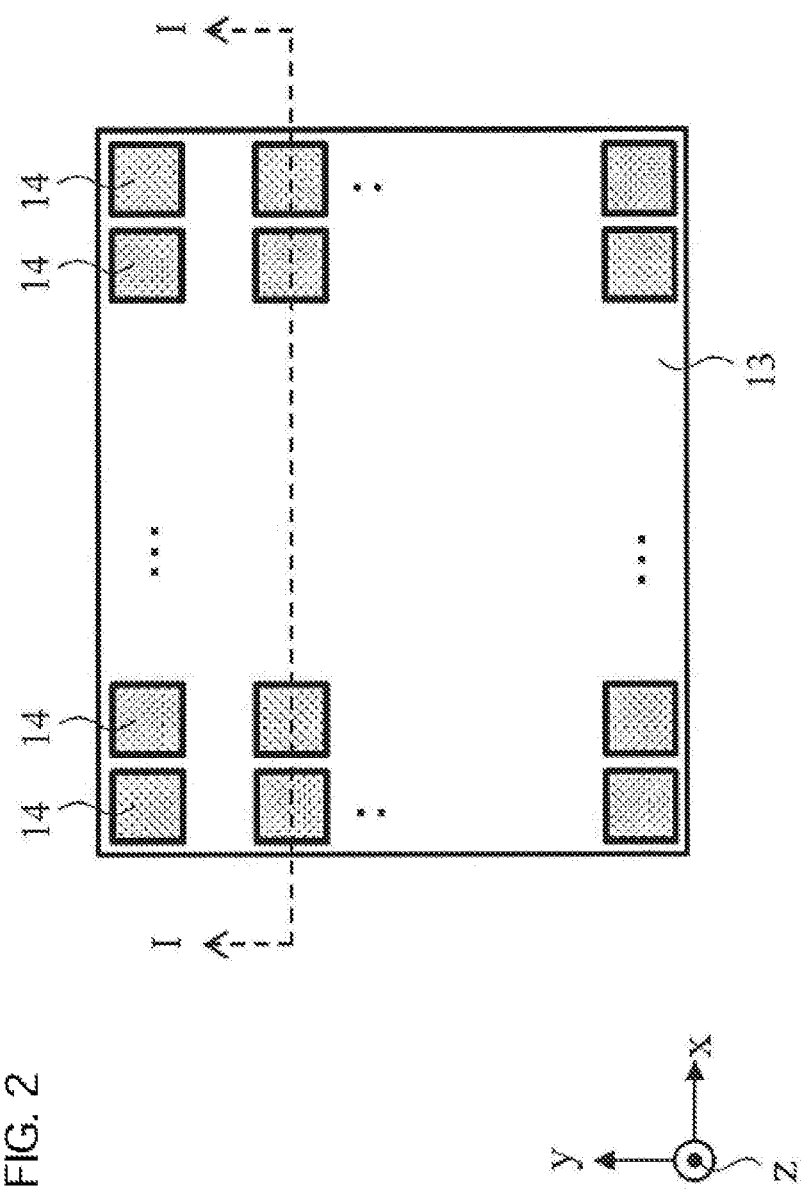
FIG. 2 is a plan view of an example where the floating electrodes are arrayed, seen from the side of the insulating film on the surface side.

FIG. 2 is a plan view of the floating electrodes 14 seen from the side of the second insulating film 15. Multiple floating electrodes 14 that are electrically independent from one another are disposed on the upper surface of the first insulating film 13. According to the present embodiment, the floating electrodes 14 are disposed in a two-dimensional array, as illustrated in FIG. 2. It is understood that the array of the floating electrodes 14 illustrated in FIG. 2 is a mere example. As illustrated in FIG. 1, each of the floating electrodes 14 forms a capacitor with the drive electrode 12 opposed thereto, and induces voltage by capacitive coupling with the drive electrode 12. The electrostatic capacitance of the capacitor formed by each floating electrode 14 and the drive electrode 12 is determined by the area of the floating electrode 14.

According to the present embodiment, as illustrated in FIG. 2, the multiple floating electrodes 14 all have the same shape and the same area. It is, however, possible for the floating electrodes 14 to have different shapes and different areas. According to the present embodiment, it is assumed that the shape of a scar generated at the second insulating film 15 has a substantially cylindrical shape with a diameter of 3 mm.

Here, the minimum shape of the floating electrode 14 accommodating the scar corresponds to a square with one side measuring 3 mm. In the present embodiment, therefore, the floating electrode 14 is configured to have a square shape with each side measuring 3 mm. Here, the area of the floating electrode 14 is 9 mm². It is understood that the shape or area of each floating electrode 14 is a mere example, and may be determined in accordance with the shape or dimension of an assumed scar. According to the present embodiment, adjacent floating electrodes 14 are arrayed in a plane with a gap of 0.5 mm between each other.

As illustrated in FIG. 1, on the upper surface of the multiple floating electrodes 14, the second insulating film 15 covering these electrodes 14 are disposed. The second insulating film 15 also serves as an operation surface directly touched by the user, preventing the human body 4 from making contact with the floating electrodes 14. According to the present embodiment, for example, acrylic resin is used for the second insulating film 15. Moreover, the second insulating film 15 has a film thickness D2 of 5 μm. It is understood that this numeric value is a mere example. According to the present embodiment, the film thickness D1 of the first insulating film 13 is the same as the film thickness D2 of the second insulating film 15. However, the film thickness D2 of the second insulating film 15 is not necessarily the same as the film thickness D1 of the first insulating film 13.

Subsequently, an example will be described where the tactile presentation device 1 according to the present embodiment is used. In the case where the second insulating film 15 has no scar, or a scar, if any, has not yet reached the floating electrode 14, when a part of the human body 4 touches the second insulating film 15, a capacitor is formed between the human body 4 and one or more floating electrodes 14 opposed to the human body 4 across the second insulating film 15 with respect to the position of contact, which causes electrostatic force according to the magnitude of the voltage induced by the floating electrodes 14 to act on the human body 4.

According to the present embodiment, 100 Hz is applied to the drive electrode 12 as signal frequency. The signal frequency satisfies the range (5-500 Hz) in which the user may perceive the tactile sense (see Japanese Patent Application Laid-Open No. 2015-97076). Accordingly, the user may perceive the change in the electrostatic force as the tactile sense.

Figure 3:
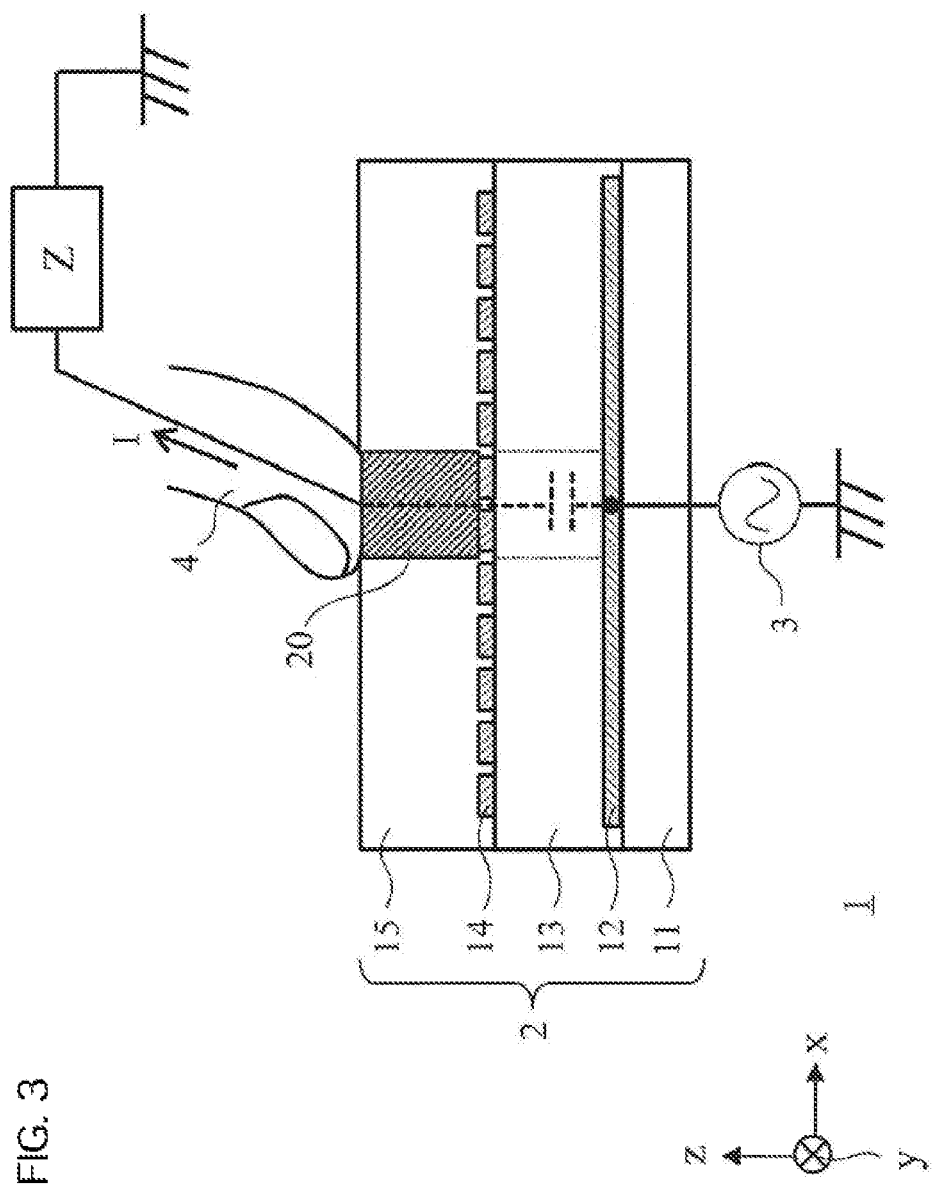
FIG. 3 schematically illustrates the use in the state where a conductive foreign substance intrudes into a scar reaching the floating electrodes.
Figure 4:
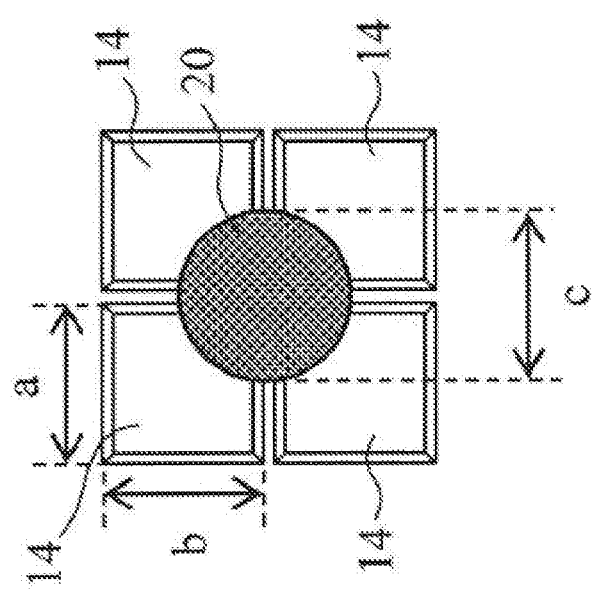
FIG. 4 illustrates a positional relationship in the case where a foreign substance is in contact with the largest number of floating electrodes.

FIG. 3 illustrates the state where a scar reaching the floating electrodes 14 is generated in the second insulating film 15, and a conductive foreign substance 20 such as water enters inside the scar. As described earlier, the present embodiment assumes that a scar having a substantially cylindrical shape with the diameter of 3 mm is formed. In such a case, the foreign substance 20 is in electrically contact with four floating electrodes 14 at most, as illustrated in FIG. 4. In FIG. 4, each of a and b represents the length of each side of the floating electrode 14, while c represents the diameter of the foreign substance 20. In the present embodiment, a, b and c each corresponds to 3 mm. Here, when the human body 4 touches the foreign substance 20, charge accumulated in the capacitor corresponding to the total area (36 mm$^2$) of the four floating electrodes 14 flows in the human body 4 as leakage current I. However, the leakage current I is equal to the amount of charge accumulated in an electrode having the area corresponding to 36 mm$^2$, and is significantly smaller than that in the tactile presentation device not provided with any measures for the leakage current I.

Figure 5B:
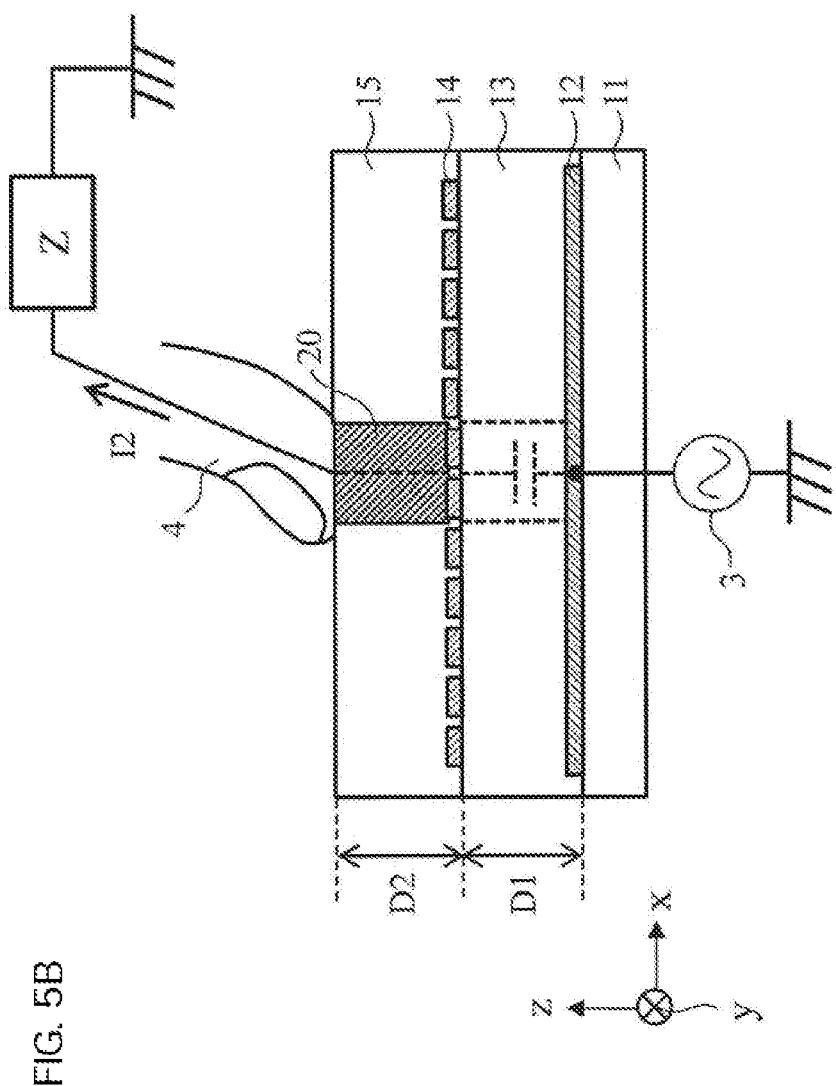
FIG. 5B illustrates the sectional structure of Embodiment 1 used for simulation.
Figure 6:
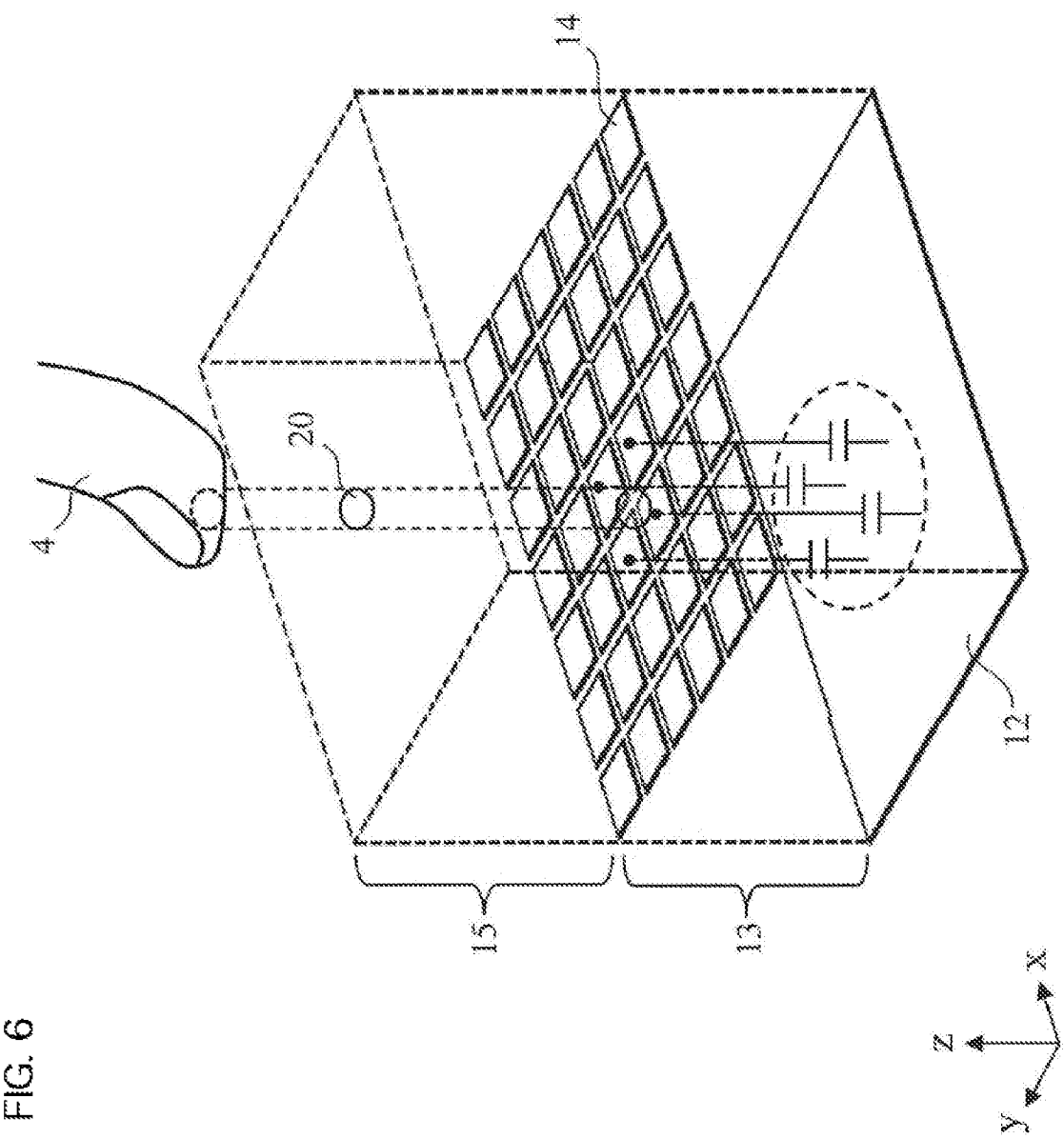
FIG. 6 is a transparent perspective view illustrating a contact model between a human body and floating electrodes according to Embodiment 1.

A result of simulation for the difference in magnitude between the leakage current possibly flowing in the tactile presentation device 1 according to the present embodiment and the leakage current possibly flowing in the tactile presentation device without any measures will be described below. First, FIGS. 5A and 5B illustrate structural examples of models used for simulation. FIG. 5A illustrates a cross-sectional structure of Comparative Example 1 where no measures are taken for leakage current. FIG. 5B illustrates a cross-sectional structure of the present embodiment. It is noted that the cross-sectional structure illustrated in FIG. 5B corresponds to the structure illustrated in FIG. 6. FIG. 6 illustrates a transparent view of the tactile presentation device 1 seen from the diagonally upper side.

In FIGS. 5A and 5B, the thickness D1 of the first insulating film 13 and the thickness D2 of the second insulating film 15 are both 5 μm. It is assumed here that a scar has a cylindrical shape with a diameter of 3 mm, and a foreign substance 20 enters therein. The impedance of the human body 4 is represented by Z. The permittivity of vacuum $\varepsilon_0$ may be calculated by $8.85 \times 10^{-12}$ F/m, while the relative permittivity ε of each insulating film is assumed as 3.0. In the case of FIG. 5A, the drive signal of 150 V/100 Hz is applied to the drive electrode 12. In the case of FIG. 5B, on the other hand, the drive signal of 184 V/100 Hz is applied to the drive electrode 12.

The floating electrode 14 in the present embodiment has the shape of a square with each side measuring 3 mm, as described earlier. Thus, according to the present embodiment illustrated in FIG. 5B, the foreign substance 20 is in contact with four floating electrodes 14 at most, as illustrated in FIG. 6. Therefore, the maximum area of the electrodes being in contact with the human body 4 through the foreign substance 20 is 36 mm$^2$. In Comparative Example 1 illustrated in FIG. 5A, on the other hand, the area being in contact with a finger through the foreign substance 20 corresponds to the total area of the drive electrode 12.

The thickness of the insulating film is different between the present embodiment and Comparative Example 1. Because of this, if the devices in the present embodiment and Comparative Example 1 are driven by the signal voltage of the same magnitude, a difference occurs in the intensity of the tactile sense perceivable on the panel surface. In the simulation, therefore, the signal voltage of 184 V is applied in the present embodiment, to comply with the intensity of the tactile sense perceived on the panel surface in Comparative Example 1.

Figure 7B:
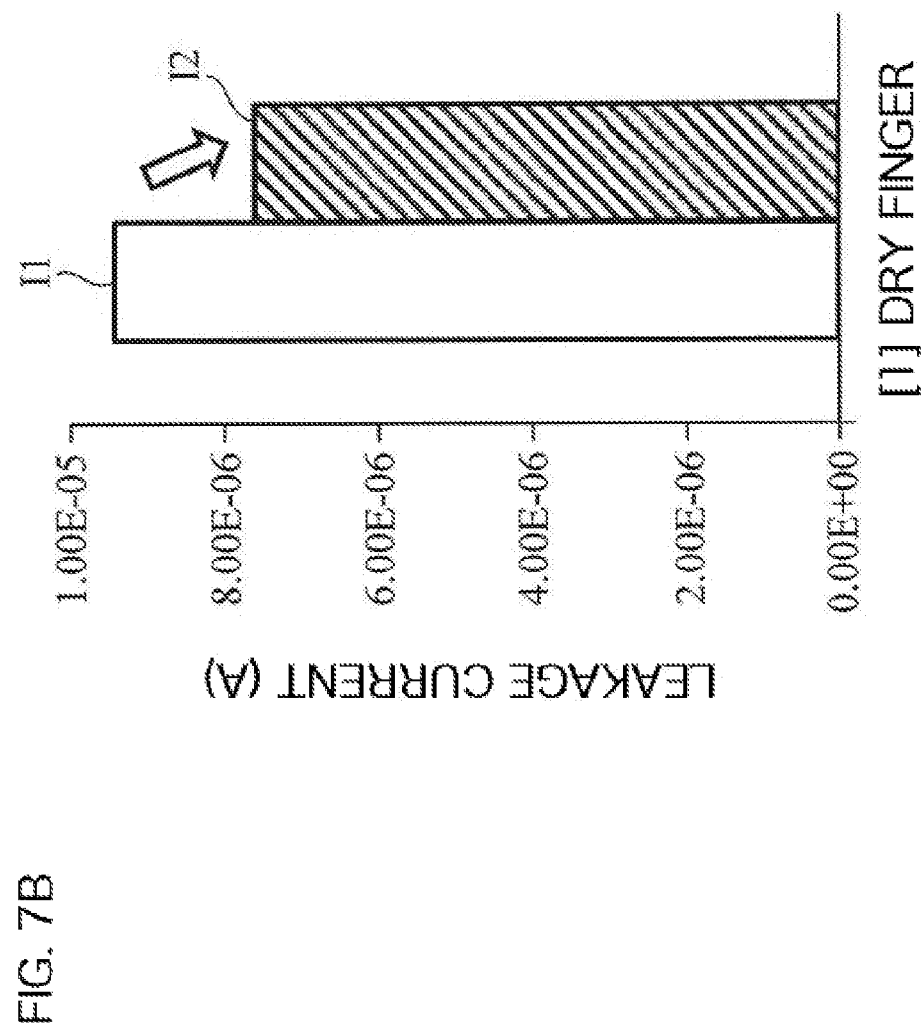
FIG. 7B is a graph illustrating simulation results obtained in the case where the human body has a dry finger.

FIGS. 7A and 7B illustrate the results of simulation. FIG. 7B is an enlarged view of a part of FIG. 7A. The present simulation was carried out for three patterns including [1] the case where a part of the human body 4 being in contact with the panel surface is dry and is not in contact with GND, [2] the case where a part of the human body 4 is dry and is in contact with GND, and [3] the case where a whole of the human body 4 is wet with water and is in contact with GND. In the drawings, the outlined bars indicate the magnitude of the leakage current I1 for the tactile presentation panel (Comparative Example 1) not provided with the measures for reducing leakage current, whereas the hatched bars indicate the magnitude of the leakage current I2 for the tactile presentation panel (Embodiment 1) provided with the measures for reducing leakage current. Note that the current value perceptible by a human being is referred to as "minimum perception current." The minimum perception current is generally regarded as 1 mA as illustrated by the broken line in FIG. 7A ("Basic Facts about Electric Shocks and Fatal Accident Statistics for the Last 30 Years" National Institute of Occupational Safety and Health, 2009, p14, 1.2.1).

In the case of [2] where a part of the human body which is in contact with the panel surface is dry and is in contact with GND, the magnitude of the leakage current I1 is 2.53 mA in Comparative Example 1 provided with no measures for reducing the leakage current, whereas the magnitude of the leakage current I2 is reduced to 22.1 μA in the present embodiment provided with measures for reducing the leakage current, as illustrated in FIG. 7A. Also in the case of [3] where the whole body is wet with water and is in contact with GND, the magnitude of the leakage current I1 is 300 mA in Comparative Example 1, whereas the magnitude of the leakage current I2 is reduced to 22.1 μA in the present embodiment. In the case of the dry finger, the magnitude of the leakage current I1 is 9.42 μA in Comparative Example 1, whereas the magnitude of the leakage current I2 is reduced to 7.60 μA in the present embodiment, as illustrated in the enlarged view of FIG. 7B.

As can be clearly seen from FIGS. 7A and 7B, in any case of [1] to [3], the leakage current I2 in the tactile presentation device 1 according to the present embodiment is smaller compared to the leakage current I1 in Comparative Example 1. Moreover, the magnitude of the leakage current I2 is significantly smaller than the minimum perception current. Specifically, in the case of [2] and [3], the leakage current I1 corresponding to Comparative Example 1 exceeds the minimum perception current, whereas the leakage current I2 corresponding to the present embodiment is significantly reduced to below the minimum perception current. According to the simulation results, the use of the tactile presentation device 1 employing the structure proposed in the present embodiment may reduce the leakage current to a safe level even if a scar is made on the second insulating film 15 and a conductive foreign substance 20 enters therein, preventing the user from perceiving the leakage current.

Embodiment 2

Figure 8:
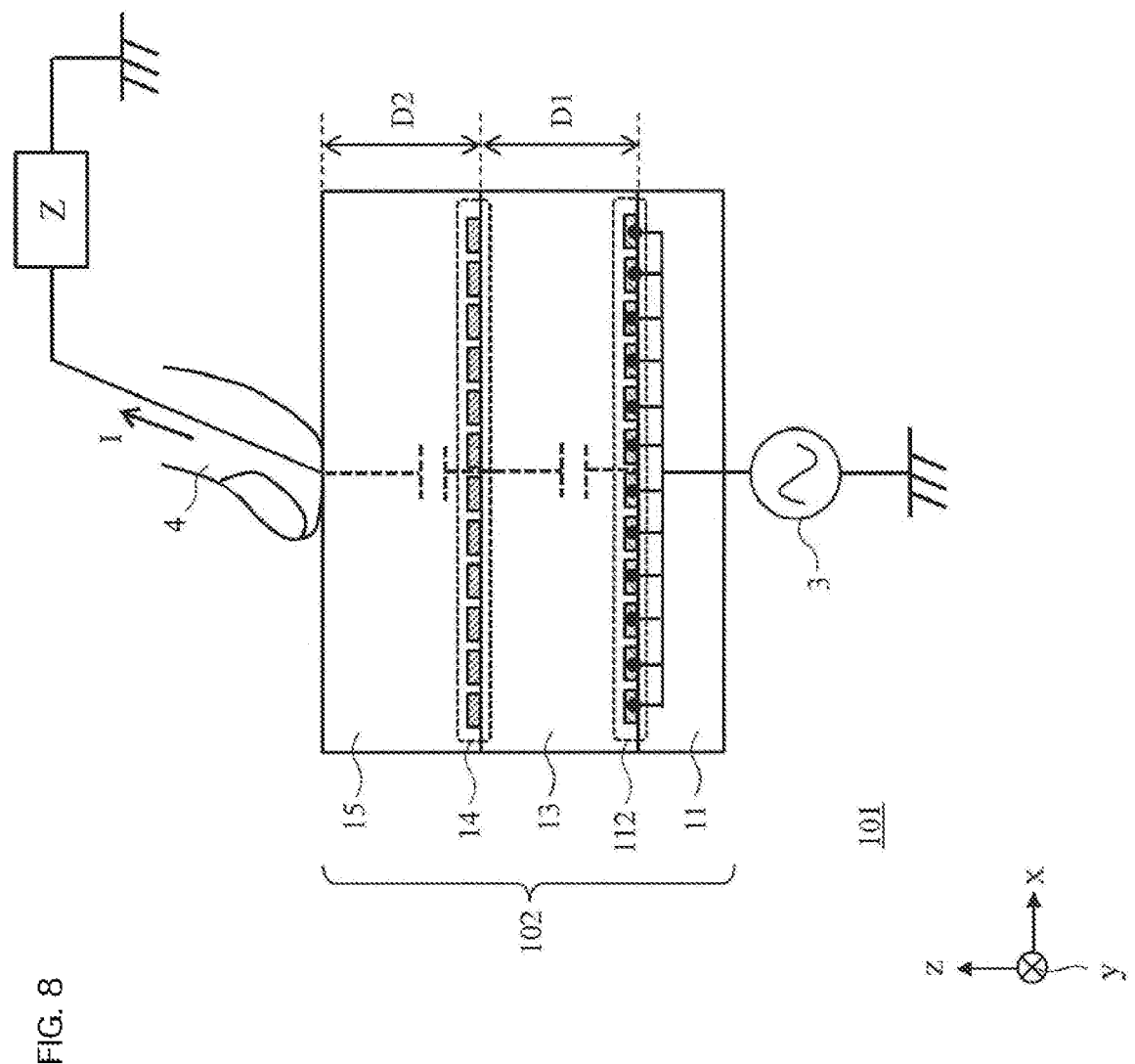
FIG. 8 is a section view illustrating the schematic configuration of a tactile presentation device according to Embodiment 2 (corresponding to the position along VIII-VIII in FIG. 9)

FIG. 8 illustrates the schematic configuration of a tactile presentation device 101 according to Embodiment 2. In FIG. 8, parts corresponding to those in FIG. 1 will be denoted by the same reference codes. FIG. 8 illustrates the cross-sectional structure at the position taken along VIII-VIII in FIG. 9 which will be described later. The tactile presentation device 101 has a basic structure similar to that of the tactile presentation device 1 according to Embodiment 1. A difference exists in that a drive electrode 112 constituting a tactile presentation panel 102 is divided into multiple electrodes.

Figure 9:
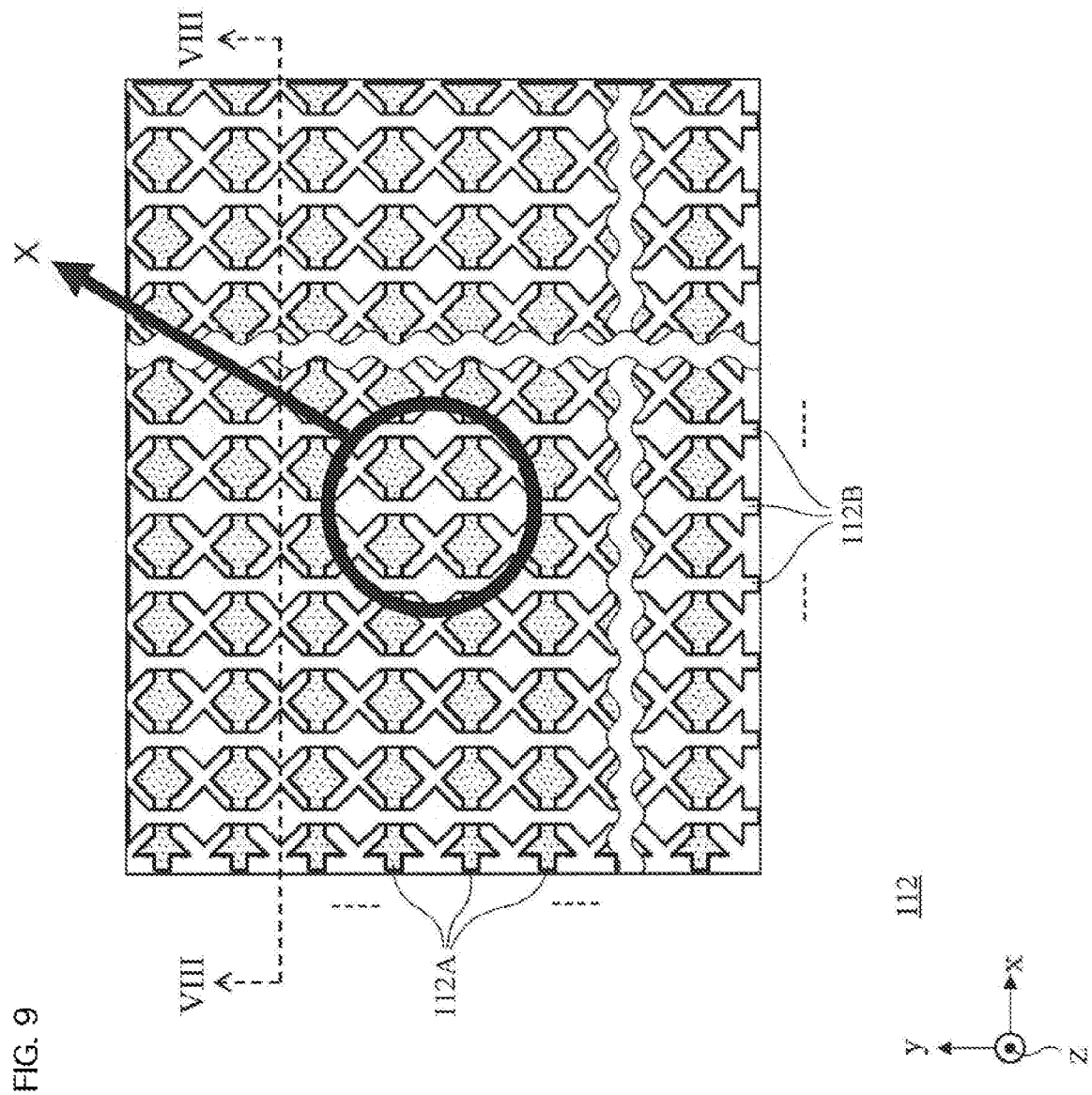
FIG. 9 is a plan view of the configuration example of a drive electrode according to Embodiment 2 seen from the side of the insulating film on the surface side.

FIG. 9 illustrates a planar view of the structure of the drive electrode 112 employed in the present embodiment. The drive electrode 112 is constituted by multiple X electrodes 112A extending in the first direction (X direction) on a support substrate 11 and multiple Y electrodes 112B extending in the second direction (Y direction) on the support substrate 11 as well. The multiple X electrodes 112A are connected to an X-electrode driving circuit (not shown) while the multiple Y electrodes 112B are connected to a Y-electrode driving circuit (not shown).

Figure 10:
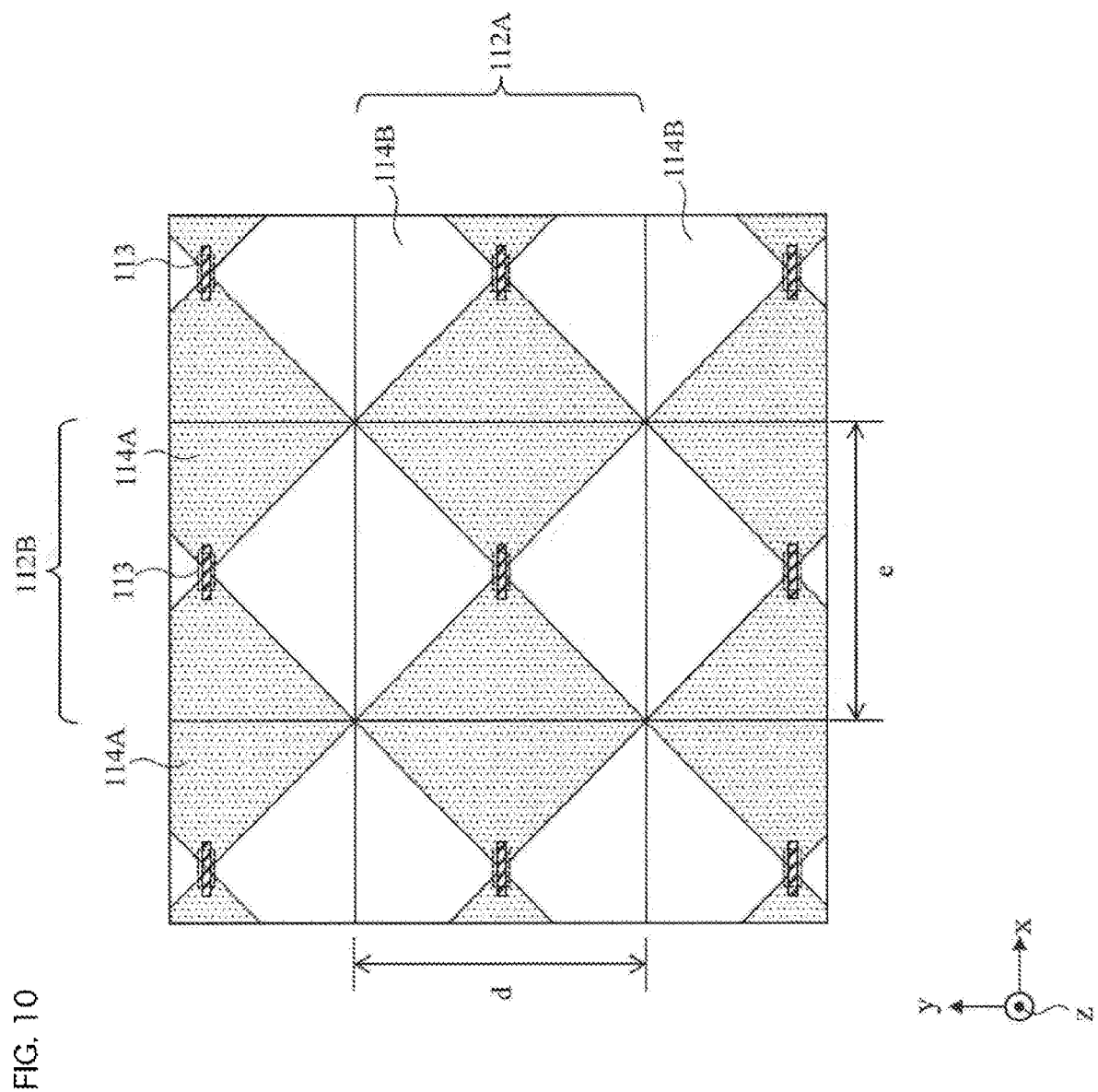
FIG. 10 is an enlarged view of a portion of the drive electrode indicated by a reference code X in FIG. 9.

FIG. 10 is an enlarged view of a portion indicated by the reference code X in FIG. 9. One X electrode 112A has a shape obtained by connecting multiple diamond-shaped electrodes 114A together in a beaded manner through respective connection parts 113. On the other hand, one Y electrode 112B has a shape obtained by connecting multiple diamond-shaped electrodes 114B together in a beaded manner through respective connection parts 113. According to the present embodiment, a dimension d of the diamond electrode 114A in the Y direction is 1668 µm, whereas a dimension e thereof in the X direction is 1692 µm. Same applies to the diamond electrode 114B.

The X electrode 112A overlaps with the Y electrode 112B only at the corresponding connection part 113, while the diamond electrode 114A is adjacent to the diamond electrode 114B on the same plane with a gap between them. That is, there is no area where the diamond electrode 114A overlaps with the diamond electrode 114B. The X electrode 112A and the Y electrode 112B cross each other at the corresponding connection part 113 with an insulating film placed between them so as to maintain electrical insulation from each other.

In the tactile presentation device 101 according to the present embodiment, the X-electrode driving circuit drives the X electrode 112A with 150 V/1000 Hz, whereas the Y-electrode driving circuit drives the Y electrode 112B at 150 V/1240 Hz. The reason for applying signal voltage of different signal frequencies respectively to the X electrode 112A and the Y electrode 112B is to present a tactile sense by making use of beat phenomenon. It is thus necessary for both the electrostatic force caused by the diamond electrode 114A and the electrostatic force caused by the diamond electrode 114B to act between each floating electrode 14 and the human body 4.

In the present embodiment, therefore, the area of the contact part 113 which is a portion where the X electrode 112A overlaps with the Y electrode 112B in planar view is made as small as possible. This can reduce the load capacitance in the case where AC voltage signals are applied to the X electrode 112A and the Y electrode 112B. As a result, increase in the size of the tactile presentation device 101 as well as enhancement in the spatial resolution are made possible, thereby suppressing the induction of unnecessary voltage which may be generated by capacitive coupling between electrodes.

Figure 11:
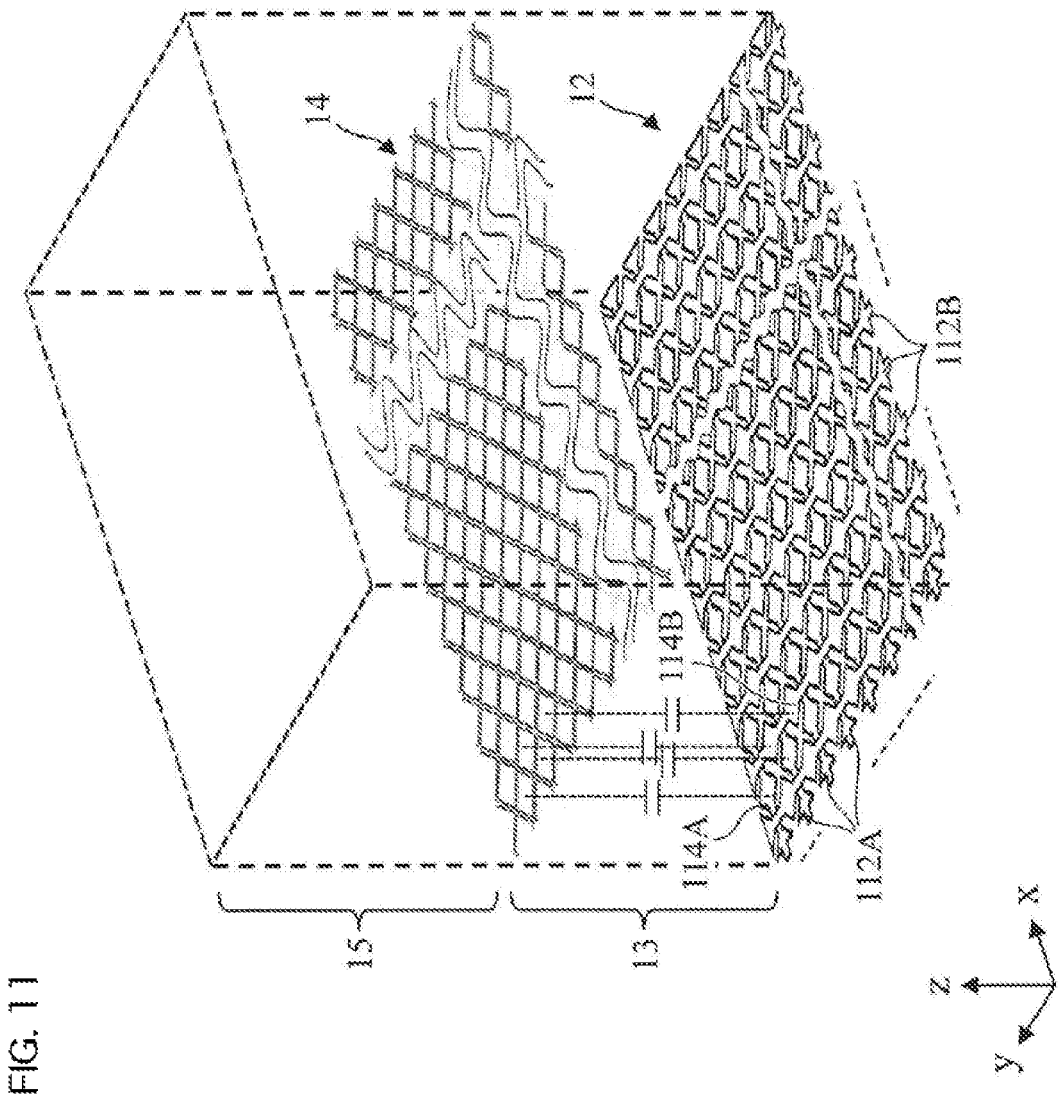
FIG. 11 is a transparent perspective view illustrating the association between diamond electrodes and floating electrodes according to Embodiment 2.

The floating electrode 14 according to the present embodiment has the same shape as each of the diamond electrodes 114A and 114B in planar view. Moreover, as illustrated in FIG. 11, the floating electrodes 14 in the upper layer are opposed to the diamond electrodes 114A and 114B in the lower layer in one-to-one correspondence to form capacitors. That is, the floating electrodes 14 are disposed directly above the respective diamond electrodes 114A and 114B. Furthermore, each of the diamond electrodes 114A and 114B are preferably aligned with each of the floating electrodes 14 in planar view.

The one-to-one correspondence between the diamond electrodes 114A or 114B and each of the floating electrodes 14 allows the electrostatic force caused by both voltage signals applied to the X electrode 112A and the Y electrode 112B to act between each floating electrode 14 and the human body 4 without waste. Furthermore, the positions of the diamond electrodes 114A and 114B to which drive signals for presenting the tactile sense are applied may be aligned with positions on the panel surface where the tactile sense is presented. This prevents lowering in the resolution of the tactile sense. Misalignment is however recognized in the positional relationship between the diamond electrode 114A or 114B and each of the floating electrodes 14 within the permissible range in manufacturing. It is understood that the floating electrodes 14 are electrically isolated from each other in the present embodiment.

Subsequently, an example will be described where the tactile presentation device 101 according to the present embodiment is used. In the case where the second insulating film 15 has no scar, or a scar, if any, has not yet reached the floating electrode 14, when a part of the human body 4 touches the second insulating film 15, a capacitor is formed between the human body 4 and one or more floating electrodes 14 opposed to the human body 4 across the second insulating film 15 with respect to the position of contact, which causes the electrostatic force according to the magnitude of the voltage induced by the floating electrodes 14 to act on the human body 4.

As described earlier, the signal frequency applied to the X electrode 112A and the signal frequency applied to the Y electrode 112B are both 500 Hz or higher, while the absolute value of the difference between two signal frequencies is 240 Hz. The driving condition satisfies a condition for the user to perceive the feel of texture (each of two signal frequencies is 500 Hz or higher and the absolute value of the difference between two signal frequencies is higher than 10 Hz and lower than 1000 Hz) (see Japanese Patent Application Laid-Open No. 2015-97076). Accordingly, the user may perceive the change in the electrostatic force as the feel of texture.

Figure 12:
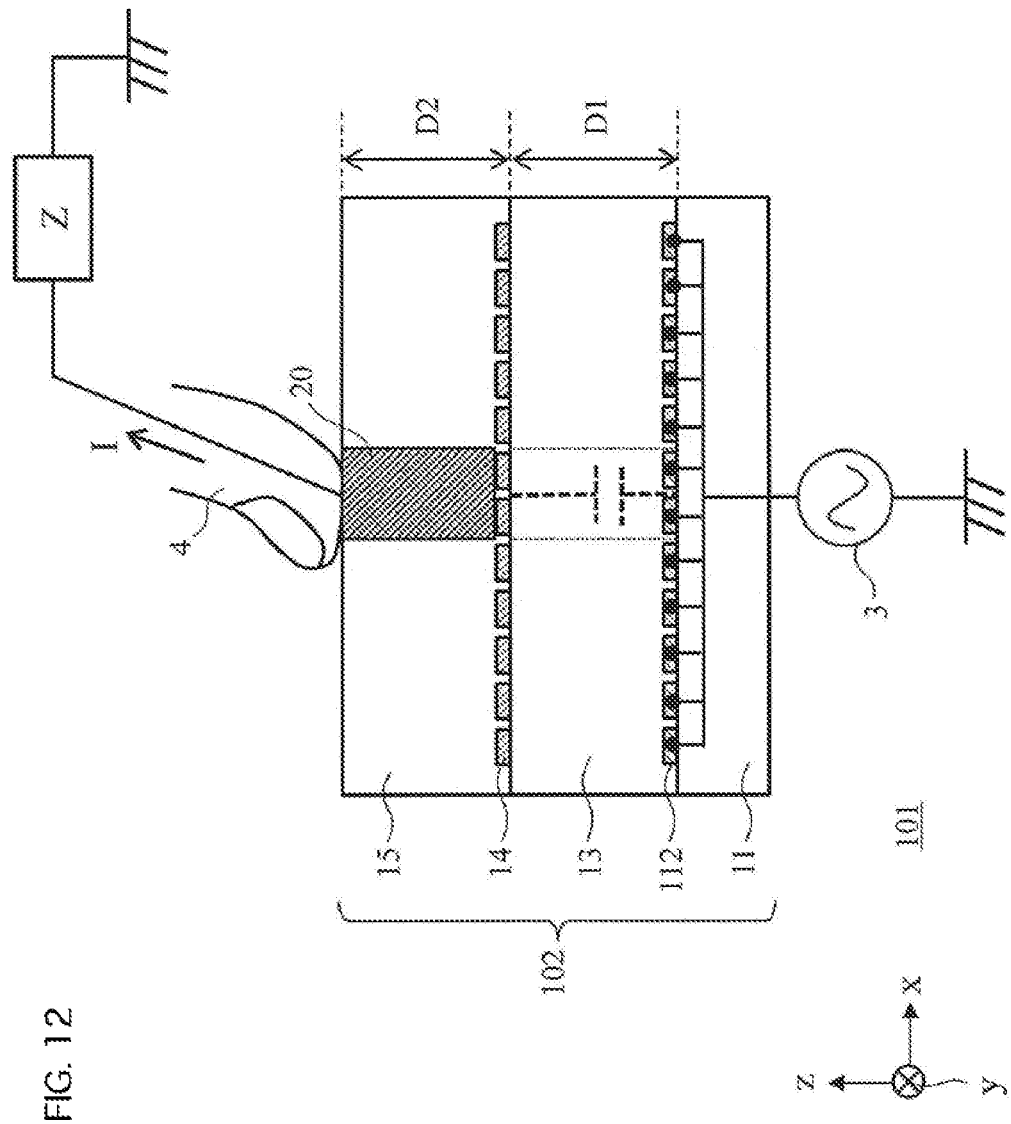
FIG. 12 schematically illustrates the use in the state where a conductive foreign substance intrudes into a scar reaching the floating electrodes.

FIG. 12 illustrates the state where a scar reaching the floating electrodes 14 is generated in the second insulating film 15, and a conductive foreign substance 20 such as water enters inside the scar. Here, it is also assumed that a scar having a substantially cylindrical shape with the diameter of 3 mm is formed. According to the present embodiment, the foreign substance 20 is in electrically contact with fourteen floating electrodes 14 at most. FIG. 13 illustrates the contacting floating electrodes 14 by hatching. It is understood that the number of floating electrodes 14 is smaller depending on the position of contact.

When the human body 4 touches the foreign substance 20, charge accumulated in the capacitor corresponding to the total area (19.7 mm²) of the fourteen floating electrodes 14 flows in the human body 4 as leakage current I. However, the magnitude of the leakage current I is substantially equal to the amount of charge accumulated in the electrodes having the area corresponding to 19.7 mm², and is significantly smaller than that in the tactile presentation device not provided with any measures for leakage current.

Figure 14A:
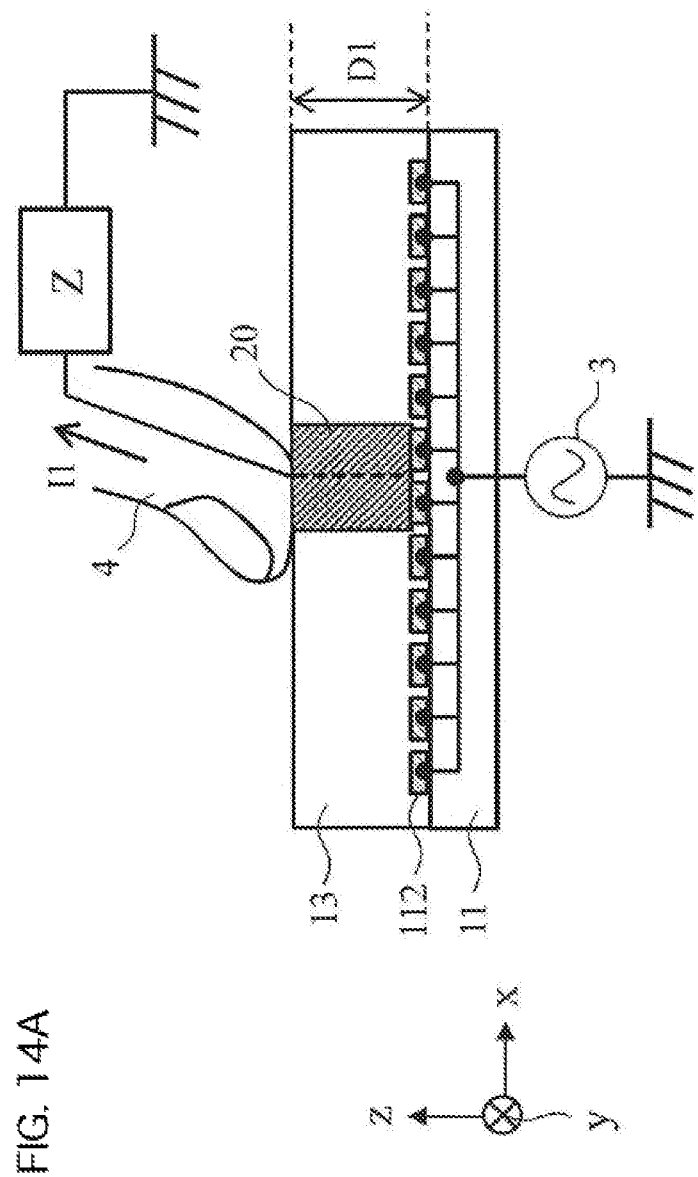
FIG. 14A illustrates the sectional structure of Comparative Example 2 used for simulation.
Figure 14B:
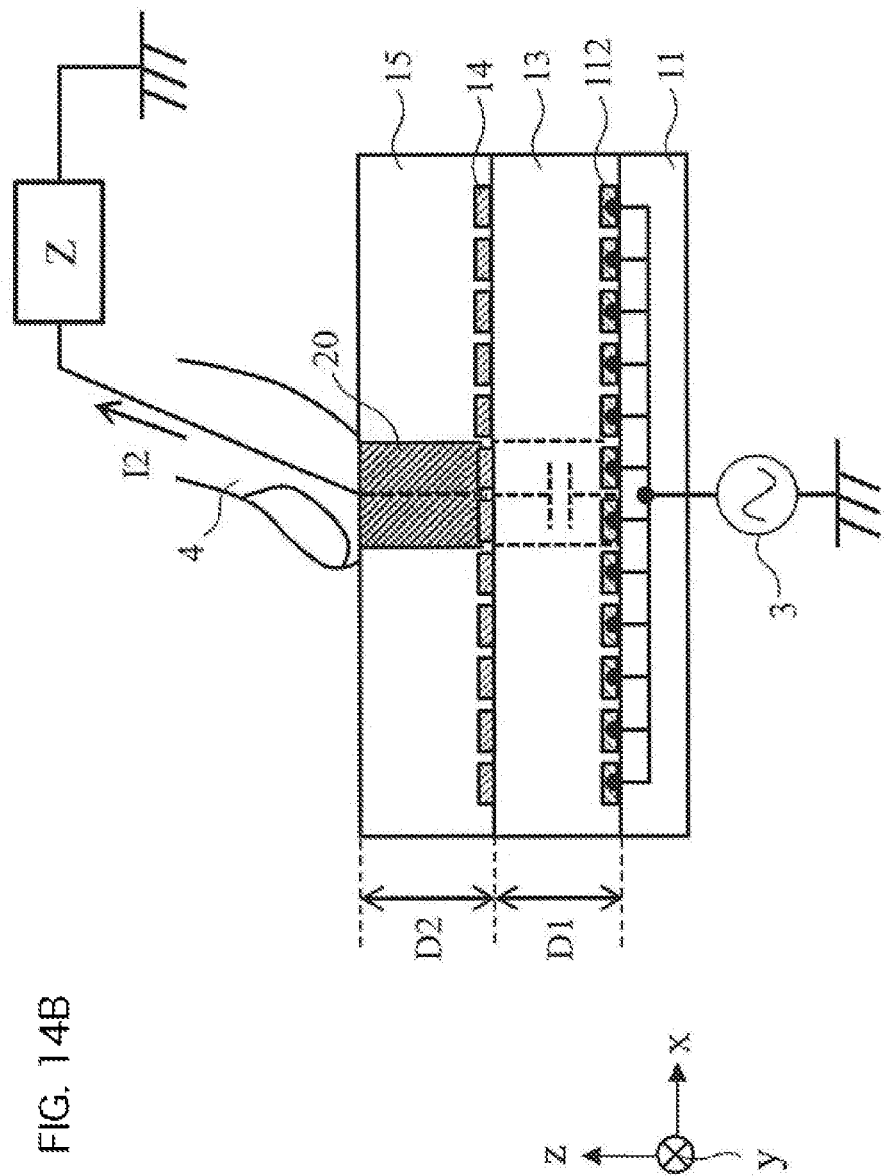
FIG. 14B illustrates the sectional structure of Embodiment 2 used for simulation.

A result of simulation for the difference in magnitude between the leakage current possibly flowing in the tactile presentation device 101 according to the present embodiment and the leakage current possibly flowing in the tactile presentation device without any measures will be described below. FIGS. 14A and 14B illustrate structural examples of models used for simulation. FIG. 14A illustrates a cross-sectional structure of Comparative Example 2 where no measures are taken for leakage current. FIG. 14B illustrates a cross-sectional structure of the present embodiment.

In FIGS. 14A and 14B, the thickness D1 of the first insulating film 13 and the thickness D2 of the second insulating film 15 are both 5 μm. It is assumed here that the scar has a cylindrical shape with a diameter of 3 mm, and the foreign substance 20 enters therein. The impedance of the human body is represented by Z. The permittivity of vacuum co may be calculated by $8.85 \times 10^{-12}$ F/m, while the relative permittivity c of the insulating film is assumed as 3.0. In the case of FIG. 14A, the drive signal of 150 V/1240 Hz is applied to the drive electrode 112. In the case of FIG. 14B, the drive signal of 184 V/1240 Hz is applied to the drive electrode 112.

Moreover, the floating electrode 14 according the present embodiment has a diamond shape with the dimension in the Y direction of 1668 μm and the dimension in the X direction of 1692 μm. Since the thickness of the insulating film is different between the present embodiment and Comparative Example 2, if they are driven by the signal voltage of the same magnitude, a difference occurs in the intensity of the tactile sense perceivable on the panel surface. In the simulation, therefore, the signal voltage of 184 V is applied in the present embodiment, to comply with the intensity of the tactile sense perceived on the panel surface in Comparison Example 2. Since frequency is increased while the impedance Z is lowered, the leakage current I2 is easier to flow. Thus, in the present simulation, between 1000 Hz used for driving the X electrode 112A and 1240 Hz used for driving the Y electrode 112B, the higher frequency of 1240 Hz is employed. This is because, if it is safe with 1240 Hz, the safety is ensured even when driven with 1000 Hz which is more difficult for current to flow.

Figure 15B:
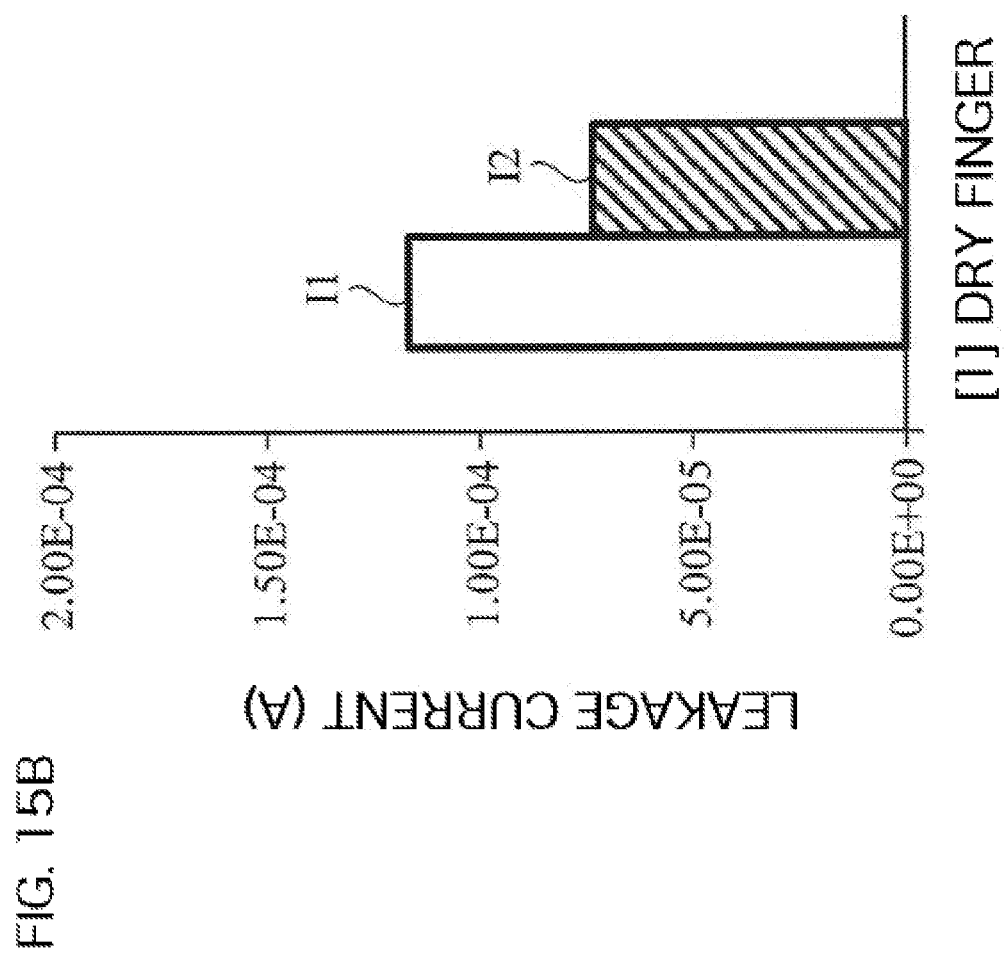
FIG. 15B is a graph illustrating simulation results obtained in the case where the human body has a dry finger.

FIGS. 15A and 15B illustrate the results of simulation. FIG. 15B is an enlarged view of a part of FIG. 15A. Similarly to the case in FIG. 7A, the present simulation was also carried out for three patterns including [1] the case where a part of the human body 4 being in contact with the panel surface is dry and is not in contact with GND, [2] the case where a part of the human body 4 is dry and is in contact with GND, and [3] the case where a whole of the human body 4 is wet with water and is in contact with GND. In the drawings, the outlined bars indicate the magnitude of the leakage current I1 for the tactile presentation panel (Comparative Example 2) not provided with the measures for reducing leakage current, whereas the hatched bars indicate the magnitude of the leakage current I2 for the tactile presentation panel (Embodiment 2) provided with the measures for reducing leakage current.

The minimum perception current is regarded as 1 mA as illustrated by the broken line in FIG. 15A. In the case of [2] where a part of the human body which is in contact with the panel surface is dry and is in contact with GND, the magnitude of the leakage current I1 is 6.36 mA in Comparative Example 2 provided with no measures for reducing the leakage current, whereas the magnitude of the leakage current I2 is reduced to 148 μA in the present embodiment provided with measures for reducing the leakage current. Also in the case of [3] where the whole body is wet with water and is in contact with GND, the magnitude of the leakage current I1 is 300 mA in Comparative Example 2, whereas the magnitude of the leakage current I2 is reduced to 150 μA in the present embodiment. In the case of the dry finger, the magnitude of the leakage current I1 is 117 μA in Comparative Example 2, whereas the magnitude of the leakage current I2 is reduced to 73.4 μA in the present embodiment, as illustrated in the enlarged view of FIG. 15B.

As can be clearly seen from FIGS. 15A and 15B, in any cases of [1] to [3], the leakage current I2 in the tactile presentation device 1 according to the present embodiment is smaller compared to the leakage current I1 in Comparative Example 2. Moreover, the magnitude of the leakage current I2 is significantly smaller than the minimum perception current. Specifically, in the case of [2] and [3], the leakage current I1 corresponding to Comparative Example 2 exceeds the minimum perception current, whereas the leakage current I2 corresponding to the present embodiment is significantly reduced to below the minimum perception current. According to the simulation results, the use of the tactile presentation device 101 employing the structure proposed in the present embodiment may reduce the leakage current to a safe level even if a scar is made on the second insulating film 15 and a conductive foreign substance 20 enters therein, preventing the user from sensing the leakage current.

Embodiment 3

Figure 16:
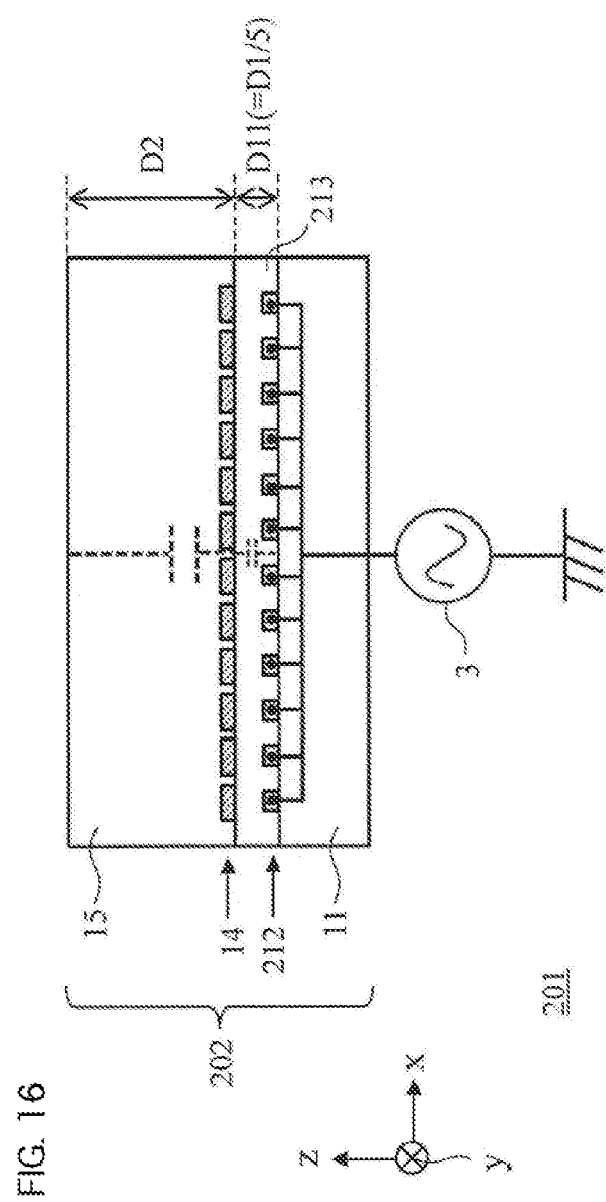
FIG. 16 is a section view illustrating the schematic configuration of a drive electrode according to Embodiment 3.

FIG. 16 illustrates the schematic configuration of a tactile presentation device 201 according to Embodiment 3. In FIG. 16, parts corresponding to those in FIG. 8 will be denoted by the same reference codes. The tactile presentation device 201 has a basic structure similar to that of the tactile presentation device 101 according to Embodiment 2. A difference exists in that the drive electrode 212 and the first insulating film 213 constituting the tactile presentation panel 202 have structures as follows.

(a) Drive Electrode 212

The area of the diamond electrodes 114A and 114B constituting the drive electrode 212 is one-fifth the area of the diamond electrodes 114A and 114B according to Embodiment 2.

(b) First Insulating Film 213

The film thickness D11 of the first insulating film 213 is one-fifth the film thickness D1 of the first insulating film 13 according to Embodiment 2. That is, D11 corresponds to D1/5.

As such, the electrostatic capacitance of the capacitor formed between the floating electrode 14 and the corresponding diamond electrode 114A or 114B is represented by the following formula.

$$C201 = \frac{\varepsilon_0 \varepsilon S201}{D11} = \frac{\varepsilon_0 \varepsilon (1/5) S101}{(1/5) D1}$$

Here, C201 is the electrostatic capacitance of the capacitor formed between the floating electrode 14 and the corresponding diamond electrode 114A or 114B. S201 represents the area of the diamond electrodes 114A and 114B in the present embodiment, whereas S101 represents the area of the diamond electrodes 114A and 114B in Embodiment 2.

With reference to the second representation on the right-hand side, the numerator and denominator both include a constant, i.e., ⅕. Here, if the constant is removed, the value after the removal will be the same value as the electrostatic capacitance of the capacitor formed between the floating electrode 14 and the corresponding diamond electrode 114A or 114B in Embodiment 2. That is, the electrostatic capacitance of the capacitor formed between the floating electrode 14 and the corresponding diamond electrode 114A or 114B takes the same value as that in Embodiment 2. Accordingly, the impedance for the signal frequency applied to the X electrode 112A and the Y electrode 112B also takes the same value as that in Embodiment 2.

Thus, even if a scar reaching the floating electrode 14 is generated in the second insulating film 15 of the tactile presentation device 201 and leakage current I2 flows in the human body 4 through the conductive foreign substance 20 intruded into the scar, the same effect of reducing such leakage current I2 as that in Embodiment 2 may be obtained. Also, the dimension of the floating electrode 14 in the present embodiment is equal to that in Embodiment 2, so that the area where the human body 4 is opposed to the floating electrode 14 as well as the potential difference between the human body 4 and the floating electrode 14 are also the same. The tactile presentation device 201 may therefore provide the user with the same tactile sense as that in the case where the tactile presentation device 101 according to Embodiment 2 is used. In addition, according to the present embodiment, the first insulating film 213 may be made thinner, which can reduce the entire thickness of the tactile presentation device 201.

Embodiment 4

Figure 17:
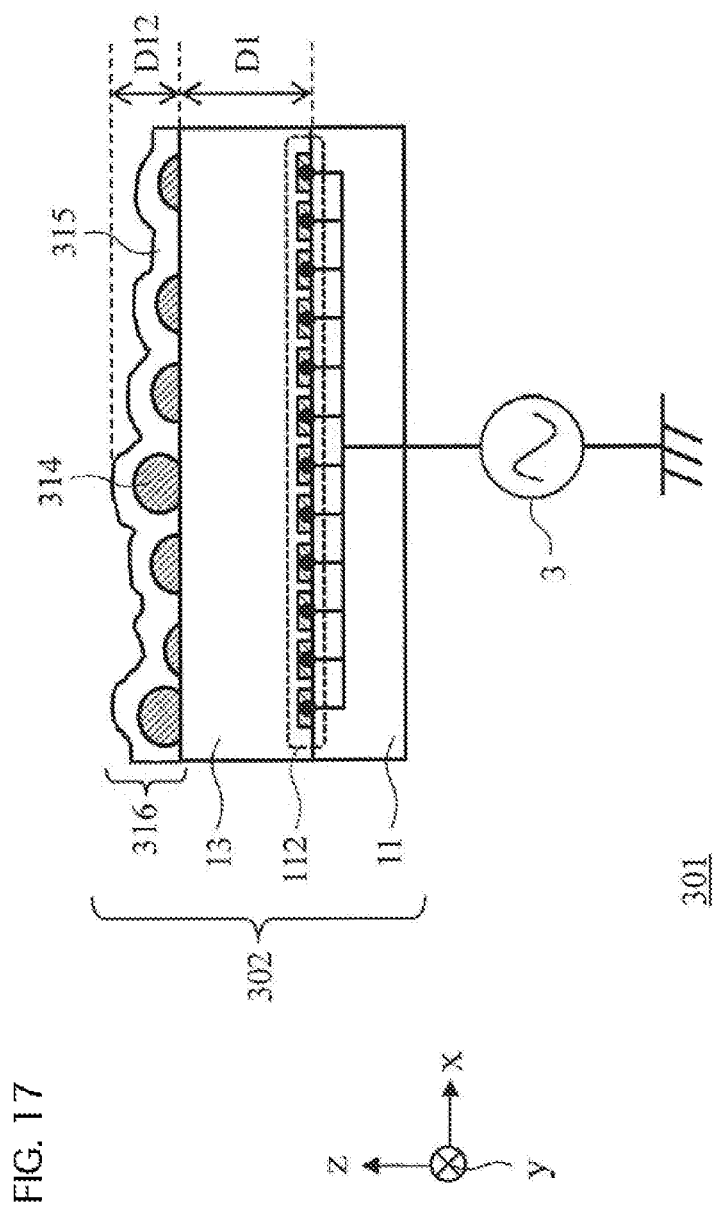
FIG. 17 is a section view illustrating the schematic configuration of a drive electrode according to Embodiment 4.

FIG. 17 illustrates the schematic configuration of a tactile presentation device 301 according to Embodiment 4. In FIG. 17, parts corresponding to those in FIG. 8 will be denoted by the same reference codes. The tactile presentation device 301 has a basic structure similar to that of the tactile presentation device 101 according to Embodiment 2. A difference exists in that a tactile presentation panel 302 formed by layering an anti-glare layer 316 on the upper surface of the first insulating film 13 is employed in place of the floating electrodes 14 and the second insulating film 15.

The anti-glare layer 316 is a so-called reflection protecting layer. The anti-glare layer 316 according to the present embodiment is formed with conductive particles 314 serving as floating electrodes and an insulating coat layer 315 serving as the second insulating film. The anti-glare layer 316 is formed by, for example, applying material used for the insulating coat layer 315 that evenly contains conductive particles 314 onto the surface of the first insulating film 13. The anti-glare layer 316 has a film thickness D12 of, for example, 5 μm. It is understood that this numeric value is a mere example.

The conductive particles 314 are present while being electrically insulated from each other inside the coat layer 315. Thus, the conductive particles 314 function similarly to the floating electrodes 14 in Embodiment 2. The particles 314 inside the coat layer 315 preferably have the total area of 19.7 $mm^2$ or smaller that is in contact with the human body 4 in the case where a cylindrical scar with the diameter of 3 mm is formed in the coat layer 315.

The anti-glare layer 316 according to the present embodiment may be applied not only to the tactile presentation panel 102 according to Embodiment 2 as described earlier, but also to the tactile presentation panel 2 according to Embodiment 1 or the tactile presentation panel 202 according to Embodiment 3. In any of the described cases, the manufacturing procedure for the floating electrode 14 and the second insulating film 15 may be simplified.

Other Structural Examples (a) While acrylic resin is exemplified as the material for the first insulating film 13 in the embodiments described earlier, transparent material such as $SiO_2$, SiN or diamond-like carbon which has higher strength may also be used. In such a case, the drive electrodes 12, 112 and the floating electrodes 14 are formed as transparent electrodes. Of course, non-transparent material stronger than acrylic resin may alternatively be used if it is unnecessary to visibly recognize characters, images, video and other information by seeing through the tactile presentation device. The use of stronger material prevents a crack from occurring in the first insulating film 13. Moreover, even if a crack is generated in the second insulating film 15 and the coat layer 315, the crack is unlikely to expand to the first insulating film 13. As a result, the first insulating film 13 may be made thinner. The thinning of the first insulating film 13 may also be applied to the first insulating film 213 (see FIG. 16) in Embodiment 3. Due to the reduced film thickness, it is also possible to employ insulating material which requires a long time for deposition.

(b) While acrylic resin is illustrated as an example of material for the second insulating film 15 in the embodiments described earlier, transparent material such as $SiO_2$, SiN or diamond-like carbon which has higher strength may also be used. In such a case, the drive electrodes 12, 112 and the floating electrodes 14 are configured as transparent electrodes. Of course, non-transparent material stronger than acrylic resin may alternatively be used if it is unnecessary to visibly recognize characters, images, video and other information by seeing through the tactile presentation device. The use of stronger material prevents a crack from occurring in the second insulating film 15, and also lowers the growth risk of a crack. Since the second insulating film 15 may be made thinner, it is also possible to employ insulating material which requires a long time for deposition. It is noted that the material of the second insulating film 15 may be the same as that of the first insulating film 13.

Applied Example

Figure 18:
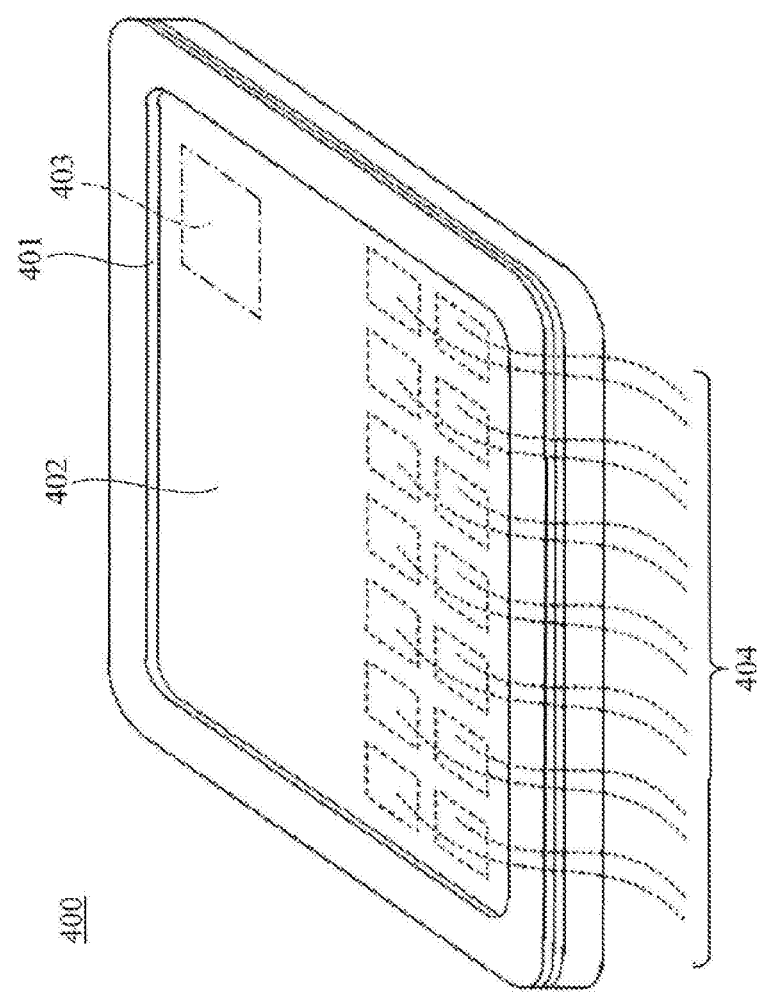
FIG. 18 illustrates an example of the outer appearance of electronic equipment mounted with a tactile presentation device.

FIG. 18 illustrates an example of the outer appearance of electronic equipment 400 which is an application of the tactile presentation device 1, 101, 201 or 301 according to each of the embodiments described earlier. The electronic equipment 400 is, in particular, a smartphone, a tablet electronic book reader, a notebook personal computer or the like.

The electronic equipment 400 includes a touch panel display device 401 and a tactile presentation device 402. The tactile presentation device 402 is a tactile presentation device according to any one of the embodiments described earlier, and is disposed on the display screen side or the rear side of the touch panel display device 401. As for the input scheme of the touch panel display device 401, an input scheme other than the electrostatic capacitive type which is the current mainstream (e.g., optical or resistance film type)

is used. This is because the tactile presentation device 402 according to each embodiment described earlier and the touch panel display device 401 of the electrostatic capacitive type both utilize the capacitive coupling with a human body, and thus cannot be compatible in terms of their functions.

The electronic device 400 has a processor 403 built therein, and the processing result is displayed on the touch panel display device 401. The user inputs data for the content displayed on the display screen of the touch panel display device 401 through touching operation to multiple operation keys 404 and the like. Alternatively, the electronic equipment 400 may display the processing result of an external device (such as a desktop personal computer, for example) externally connected thereto through a cable or wireless communication, and return the operation input back to the external device.

While several embodiments of the present invention have been described with reference to the drawings, the present invention is not limited to the embodiments described above. The present invention may also have a configuration employing a known optional structure as long as the effect of reducing leakage current flowing through a human body is obtained.

According to the present disclosure, even if leakage current flows in a human body through a scar formed on an operation surface, the magnitude thereof may be suppressed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A tactile presentation panel comprising:
   a support substrate;
   a plurality of drive electrodes located on the support substrate;
   a first insulating film located on the support substrate and covering the plurality of drive electrodes;
   a plurality of floating electrodes electrically independent from one another disposed on the first insulating film;
   a second insulating film covering the plurality of floating electrodes; and
   a signal power supply connected to the plurality of drive electrodes and supplying a voltage signal to the plurality of drive electrodes for presenting a tactile sense,
   wherein
   the plurality of floating electrodes are provided in a layer in which no drive electrode exists,
   and
   each of the plurality of floating electrodes is aligned with each of the plurality of drive electrodes in one-to-one correspondence in planar view seen from a side of the second insulating film.

2. The tactile presentation panel according to claim 1, wherein
   each of the floating electrodes has a rectangular shape, and the plurality of floating electrodes are disposed in a two-dimensional array on the first insulating film.

3. The tactile presentation panel according to claim 1, wherein
   each of the drive electrodes has an area smaller than an area of each of the floating electrodes that are respectively aligned with the drive electrodes in planar view.

4. The tactile presentation panel according to claim 1, wherein
   the area of each of the floating electrodes is equal to or smaller than 9 mm2.

5. The tactile presentation panel according to claim 1, wherein
   each of the floating electrodes is a conductive particle.

6. The tactile presentation panel according to claim 5, wherein
   the second insulating film and the plurality of floating electrodes constitute an anti-glare layer.

7. The tactile presentation panel according to claim 1, wherein
   each one of the drive electrodes and the plurality of floating electrodes is a transparent electrode.

8. The tactile presentation panel according to claim 1, wherein
   the first insulating film is formed with any one of SiO2, SiN and diamond-like carbon.

9. The tactile presentation panel according to claim 1, wherein
   the second insulating film is formed with any one of SiO2, SiN and diamond-like carbon.

10. An electronic equipment comprising:
    a touch panel display device displaying a processing result obtained by a built-in processor, and accepts an operation input corresponding to the processing result; and
    the tactile presentation device according to claim 1 presenting a feel of texture corresponding to display of the processing result.

11. A tactile presentation panel comprising:
    a support substrate;
    a plurality of X drive electrodes located on the support substrate;
    a plurality of Y drive electrodes located on the support substrate and insulated from the plurality of X drive electrodes;
    a first insulating film located on the support substrate and covering the plurality of X drive electrodes and the plurality of Y drive electrodes;
    a plurality of floating electrodes electrically independent from one another disposed on the first insulating film;
    a second insulating film covering the plurality of floating electrodes; and
    a first signal power supply connected to the plurality of X drive electrodes to supply a first voltage signal and a second signal power supply connected to the plurality of Y drive electrodes to supply a second voltage signal,
    wherein
    the plurality of floating electrodes are provided in a layer in which no X drive electrode and Y drive electrode exist, and
    each of the plurality of floating electrodes is aligned with the X drive electrodes and the Y drive electrodes in one-to-one correspondence in planar view seen from a side of the second insulating film.

12. A tactile presentation panel comprising:
    a support substrate;
    a drive electrode located on the support substrate;
    a first insulating film located on the support substrate and covering the drive electrode;
    a plurality of floating electrodes electrically independent from one another disposed on the first insulating film;
    a second insulating film covering the plurality of floating electrodes; and a signal power supply connected to the drive electrode and supplying a voltage signal to the drive electrode for presenting a tactile sense, wherein the drive electrode is a single electrode, the plurality of floating electrodes are provided in a layer in which no drive electrode exists, and the plurality of floating electrodes are aligned with the drive electrode in planar view seen from a side of the second insulating film.

* * * * *